United States Patent
Pawar et al.

(10) Patent No.: US 8,364,193 B1
(45) Date of Patent: Jan. 29, 2013

(54) FORWARD LINK POWER CONTROL

(75) Inventors: Hemanth Balaji Pawar, Herndon, VA (US); Shilpa Kowdley Srinivas, Herndon, VA (US)

(73) Assignee: Sprint Communications Company L.P., Overland Park, KS (US)

(*) Notice: Subject to any disclaimer, the term of this patent is extended or adjusted under 35 U.S.C. 154(b) by 729 days.

(21) Appl. No.: 12/435,009

(22) Filed: May 4, 2009

(51) Int. Cl.
*H04B 7/00* (2006.01)

(52) U.S. Cl. ....... 455/522; 455/69; 455/101; 455/127.1; 455/424

(58) Field of Classification Search .................... 455/69, 455/101, 404.2, 414.1, 456.5, 450, 522
See application file for complete search history.

(56) References Cited

U.S. PATENT DOCUMENTS

| | | | |
|---|---|---|---|
| 5,842,113 A * | 11/1998 | Nanda et al. ............. | 455/69 |
| 7,020,482 B2 * | 3/2006 | Medvedev et al. ......... | 455/522 |
| 7,076,263 B2 * | 7/2006 | Medvedev et al. ......... | 455/522 |
| 7,123,887 B2 * | 10/2006 | Kim et al. ................ | 455/103 |
| 7,139,328 B2 * | 11/2006 | Thomas et al. ........... | 375/299 |
| 7,221,956 B2 * | 5/2007 | Medvedev et al. ......... | 455/522 |
| 7,239,886 B2 | 7/2007 | Gross et al. | |
| 7,302,009 B2 * | 11/2007 | Walton et al. ............. | 375/267 |
| 7,492,749 B2 * | 2/2009 | Song et al. ............... | 370/342 |
| 7,630,732 B2 * | 12/2009 | Pan et al. ................ | 455/522 |
| 7,702,353 B2 * | 4/2010 | Naden et al. ............. | 455/522 |
| 7,711,330 B2 * | 5/2010 | Yang et al. ............... | 455/101 |
| 7,869,537 B2 * | 1/2011 | Catreux et al. ............ | 375/267 |
| 2002/0067701 A1 | 6/2002 | Chen et al. | |
| 2002/0098860 A1 | 7/2002 | Pecen et al. | |
| 2003/0139196 A1 | 7/2003 | Medvedev et al. | |
| 2003/0157954 A1 | 8/2003 | Medvedev et al. | |
| 2004/0032910 A1 | 2/2004 | Horng et al. | |
| 2004/0258012 A1 | 12/2004 | Ishii | |
| 2005/0130694 A1 | 6/2005 | Medvedev et al. | |
| 2006/0116155 A1 | 6/2006 | Medvedev et al. | |
| 2006/0203731 A1 * | 9/2006 | Tiedemann et al. ........ | 370/235 |
| 2006/0262874 A1 | 11/2006 | Shan | |
| 2007/0118661 A1 | 5/2007 | Vishwanathan et al. | |
| 2007/0258392 A1 | 11/2007 | Larsson et al. | |
| 2008/0132265 A1 | 6/2008 | Tudosoiu | |
| 2008/0194226 A1 | 8/2008 | Rivas et al. | |
| 2010/0056170 A1 | 3/2010 | Lindoff et al. | |
| 2010/0203916 A1 * | 8/2010 | Tiwari et al. ............. | 455/513 |
| 2010/0322333 A1 * | 12/2010 | Goransson et al. ......... | 375/260 |

OTHER PUBLICATIONS

U.S. Appl. No. 12/257,583, filed Oct. 24, 2008.
U.S. Appl. No. 13/035,778, filed Feb. 25, 2011.

* cited by examiner

*Primary Examiner* — Linh Nguyen (57) ABSTRACT

A wireless device is configured with a power control parameter having a first value. The first power control parameter determines whether the wireless device requests an increase in transmit power from a base station. A profile is determined to be associated with the wireless device. An indicator selecting a multi-antenna mode is received from the wireless device. Based on the profile and the indicator, the wireless device is configured with the power control parameter having a second value.

19 Claims, 6 Drawing Sheets

FORWARD LINK POWER CONTROL

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). This and certain other ITU standards may be known as the CDMA2000 group of standards. The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

A method of operating a communication system is disclosed. From a wireless device, an indicator selecting a first multi-antenna mode is received. The wireless device is determined to be associated with a first profile. Based on the indicator and the first profile, transmit power to the wireless device is increased.

A method of operating a communication system is disclosed. A wireless device is configured with a power control parameter having a first value. The first power control parameter determines whether the wireless device requests an increase in transmit power from a base station. A profile is determined to be associated with the wireless device. An indicator selecting a multi-antenna mode is received from the wireless device. Based on the profile and the indicator, the wireless device is configured with the power control parameter having a second value.

A method of operating a wireless device is disclosed. The wireless device is sent a first configuration. The wireless device is determined to be operating in a first multi-antenna mode. The wireless device is determined to be associated with a first profile. Based on the wireless device operating in the first multi-antenna mode, and the wireless device being associated with the first profile, the wireless device is sent a second configuration.

DETAILED DESCRIPTION

In an embodiment, a wireless device is capable of operating using a space-time coding MIMO mode (MIMO-A), or a in a MIMO mode wherein a data stream is split into multiple lower rate data streams and each data stream is transmitted from a different transmit antenna in the same frequency channel (MIMO-B). MIMO-A is typically selected in coverage areas farther from the base station than MIMO-B.

In an embodiment, a base station interprets the selection of MIMO-B by a wireless device associated with a high quality of service profile (e.g., "gold") as a request to increase transmit power to the wireless device. The base station may increase the transmit power to the wireless device by an arbitrary amount. The base station may reconfigure the wireless device such that the wireless device is more likely to request increases in the base station's transmit power. For example, the base station may configure the wireless device to seek a lower frame error rate (FER). This may result in the wireless device asking the base station to increase its transmit power in order to reduce the FER.

Figure 1:
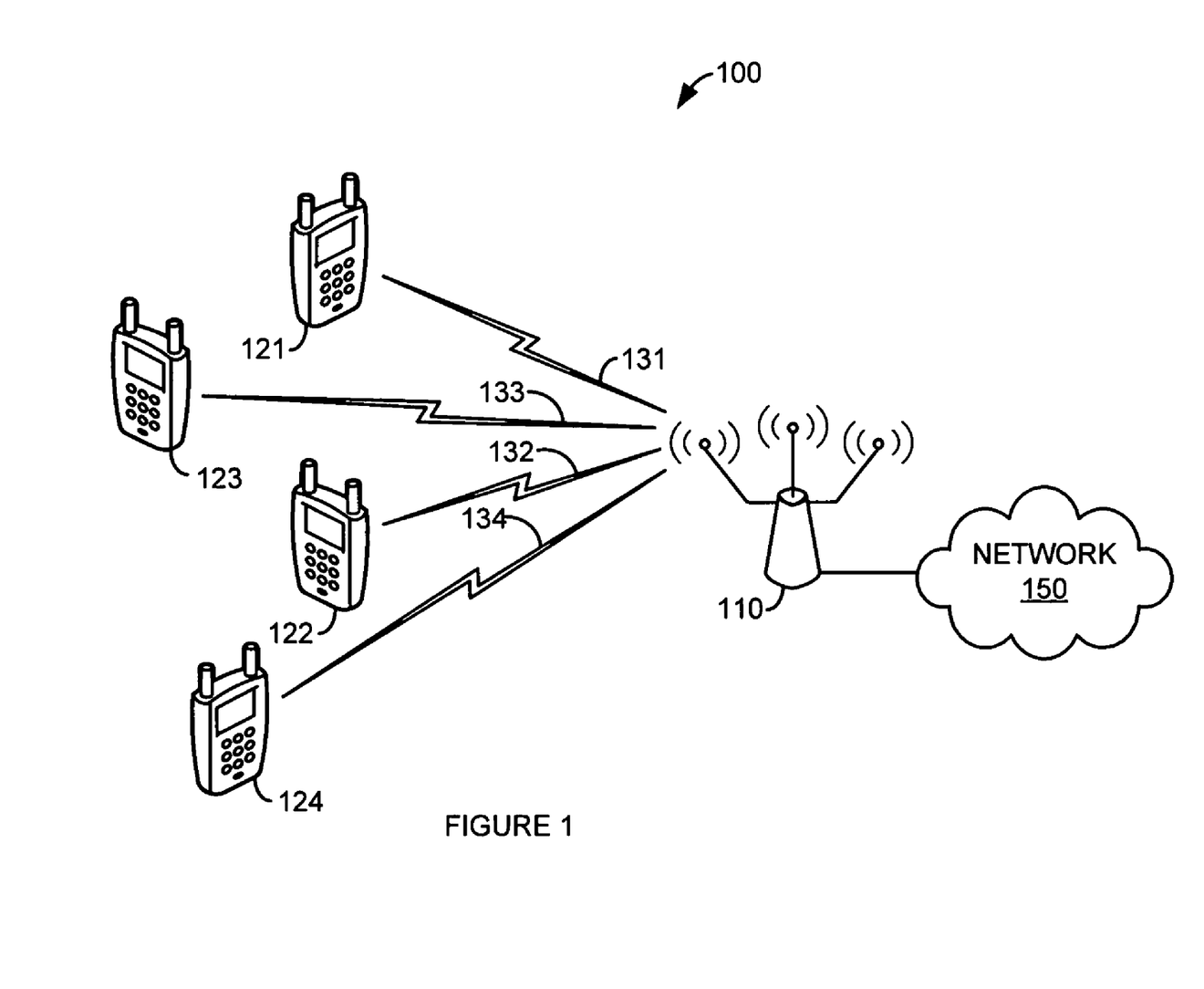
FIG. 1 is a block diagram illustrating a communication system.

FIG. 1 is a block diagram illustrating a communication system. In FIG. 1, communication system 100 comprises base station 110, wireless device 121, wireless device 122, wireless device 123, wireless device 124, and network 150. Base station 110 is operatively coupled to network 150. Wireless devices 121-124 are operatively coupled to base station 110 via wireless links 131-134, respectively. Thus, wireless devices 121-124 may be operatively coupled to network 150 via base station 110.

Base station 110 includes multiple antennas and multiple transmitters. Base station 110 may include multiple receivers. Wireless devices 121-124 may include multiple antennas, multiple receivers, and multiple transmitters.

Wireless devices 121-124 may be any device, system, combination of devices, or other such communication platform capable of communicating with base station 110 using multiple antennas. Wireless devices 121-124 may use communication aspects specified by the CDMA2000, or WiMAX, specifications including, but not limited to, the multiple-input multiple-output (MIMO) modes detailed therein. Wireless devices 121-124 may comprise communication interface and processing elements configured to operate as described.

Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. Wireless devices 121-124 may also include a user interface, memory device, software, processing circuitry, or some other communication components. Wireless communication devices 121-124 may be a phone, computer, e-book, mobile Internet appliance, wireless network interface card, media player, game console, or some other wireless communication apparatus—including variations or combinations thereof. Wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas. Other types of communication platforms are possible.

Wireless devices 121-124 may establish communication sessions with base station 110 in order to receive communication services from network 150. These services may include voice services and data services. These services may include, but are not limited, to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be exchanged with wireless devices 121-124 and base station 110. These traffic flows may have one or more service flow classifications. For example, base station 110 may exchange traffic flows with wireless device 121 that includes a service traffic flow classification for voice service, and a service traffic flow classification for a web browsing service. The service traffic flow classifications for voice service and for web browsing service may have different quality of service (QoS) requirements. In an embodiment, the traffic flows for these services have different service flow classifications.

In an embodiment, the service flow classifications may include wireless traffic classifications. For example, for WiMAX wireless communication, there are wireless traffic quality of service classifications that include: unsolicited grant service (UGS), real time polling service (rtPS), extended real time polling service (ertPS), non-real time polling service (nRTPS), and best effort (BE).

Base station 110 may be any wireless system that provides the air-interface to wireless devices 121-124 using multiple antennas. Base station 110 may use one or more transmitters. Base station 110 may use one or more receivers. Base station 110 may be any wireless system that can provide an air-interface to wireless devices 121-124 using multiple antennas. Base station 110 may use communication aspects specified by the CDMA2000 or WiMAX specifications including, but not limited to, the MIMO modes detailed therein. Examples of base stations that may be utilized include, base transceiver stations (BTSs), radio base stations (RBSs), Node B, enhanced Node B (eNBs) and others. Base station 110 may include a number of elements known to those skilled in the art comprising transceivers, power amplifiers, combiner, duplexer, and antennas. Base station 110 may include additional components such as a control function or control computer. However, these additional components have been omitted from FIG. 1 for the sake of brevity.

Wireless links 131-134 uses the air, or space, as the transport media. Wireless links 131-134 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Network 150 may be any network or collection of networks that couple, link, or otherwise operatively connect base station 110 with other devices or systems. Network 150 may include other secondary data networks. In an example, network 150 may include a backhaul network, a local network, a long distance network, a packet network, the internet, or any combination thereof, as well as other types of networks. Network 150 may comprise communication links that use metal, glass, air, space, or some other material as the transport media. These communication links could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. The communication links of network 150 could be direct links, or may include intermediate networks, systems, or devices.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless devices 121-124 may be operated in M by N multiple-input multiple-output (MIMO) modes. M is the number of transmitters and/or antennas that base station 110 is using to transmit a data stream to a given wireless device 121-124. N is the number of receivers and/or antennas that a given wireless device 121-124 is using to receive a data stream from base station 110. In an embodiment, M and N may both be two (2). In this case, a given wireless devices 121-124 would be said to be operating in 2×2 MIMO mode. In another embodiment, M=1 and N=2. In this case, a given wireless device would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna of base station 110 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas of base station 110 using certain principles of full or near orthogonal coding. This mode may be referred to as diversity coding MIMO or space-time coding MIMO (STC-MIMO). In a WiMAX specified system, STC-MIMO may be known as MIMO-A. SM-MIMO may be known as MIMO-B. STC-MIMO, SM-MIMO, along with other multi-antenna techniques where M>1 and N>=1 may be referred to collectively as multi-antenna modes.

In an embodiment, wireless devices 121-122 may be associated with a first profile. Wireless devices 123-124 may be associated with a second profile. For example, wireless devices 121 and 122 may be associated with a higher subscriber quality of service profile than wireless devices 123-124. In other words, communication system 100 may associate wireless devices 121 and 122 with a subscriber profile (e.g., "gold") that is designed to differentiate wireless devices 121 and 122 from wireless devices 122 and 124 which are associated with a lower quality of service subscriber profile (e.g., "silver" or "bronze").

In another example, wireless devices 121 and 122 may be associated with a higher service flow quality of service profile than wireless devices 123 and 124. In other words, service flow classifications (e.g., UGS or rtPS) that have higher priority may be associated with wireless devices 121 and 122 than service flow classifications associated with wireless devices 121 and 122 (e.g., nRTPS or BE).

Based on the aforementioned profiles, communication system 100 may undertake efforts to improve the quality of service provided to wireless devices associated with higher quality of service profiles (e.g., wireless devices 121 and 122) at the expense of wireless devices associated with lower quality of service profiles (e.g., wireless devices 123 and 124). In an embodiment, when a wireless device 121 or 122 associated with a higher quality of service profile selects MIMO-A, then base station 110 may increase transmit power to that device. In another embodiment, when a wireless device 121 or 122 associated with a higher quality of service profile selects MIMO-A, then base station 110 may reconfigure that wireless device 121 or 122 so that it is more likely to request increased transmit power from base station 110. In another embodiment, when a wireless device 123 or 124 associated with a lower quality of service profile selects MIMO-B, then base station 110 may reconfigure that wireless device 123 or 124 so that it is less likely to request increased transmit power from base station 110.

For example, base station 110 may configure itself or wireless device 121, which is associated with a high quality of service profile, with a power control parameter that determines whether wireless device 121 requests an increase in transmit power from base station 110. When wireless device 121 selects MIMO-A, base station 110 may reconfigure the power control parameter so that wireless device 121 is more likely to request increases in power from base station 110. In particular, base station 110 may reconfigure wireless device 121 with a power control parameter that makes wireless device 121 more likely to request increases in power than a wireless device associated with a lower quality of service profile, such as wireless device 123.

In another example, base station 110 may configure itself or wireless device 123, which is associated with a lower quality of service profile, with a power control parameter that determines whether wireless device 123 requests an increase in transmit power from base station 110. When wireless device 123 selects MIMO-B, base station 110 may reconfigure the power control parameter so that wireless device 123 is less likely to request increases in power from base station 110.

For example, systems specified by CDMA2000 may implement closed-loop power control. The power control parameters that govern this closed-loop power control may be configured to make it more likely wireless device 121 will request increases (or less likely to request decreases) in transmit power from base station 110. The power control parameters that govern this closed-loop power control may be configured to make it less likely wireless device 123 will request increases (or more likely to request decreases) in transmit power from base station 110.

In an embodiment, closed-loop power control involves the wireless device 121-124 measuring received power. This measurement is compared against a threshold that the wireless device 121-124 feeds back to base station 110 in the form of a request to power up or power down. In response to the power up or power down request, the base station adjusts the transmit power accordingly.

Closed-loop power control may involve an inner loop and an outer loop. The inner loop may be done as follows: (1) a wireless device 121-124 monitors a signal-to-noise ratio such as an energy per bit to noise ratio ($E_b/N_o$); (2) if $E_b/N_o$ exceeds a certain threshold (i.e., $E_b/N_o$ setpoint), then the wireless device 121-124 requests base station 110 to decrease transmit power; (3) if $E_b/N_o$ is less than a certain threshold, then the wireless device 121-124 requests base station 110 to increase transmit power. The requests to increase and/or decrease transmit power may be sent using power control bits (PCBs).

The relationship between FER and $E_b/N_o$, however, may be constantly changing. Thus, the $E_b/N_o$ setpoint may be dynamically adjusted to maintain an acceptable FER. This adjustment is referred to as the outer loop. After wireless device 121-124 demodulates a received signal, it may estimate the FER. Using the current FER, and $E_b/N_o$ setpoint, wireless device 121-124 may compute a new $E_b/N_o$ setpoint that is required to maintain an acceptable, or desired, FER. This new $E_b/N_o$ setpoint may then be used to govern the inner loop.

In an embodiment, a desired (or target) FER, $E_b/N_o$ setpoint, maximum $E_b/N_o$ setpoint, minimum $E_b/N_o$ setpoint, maximum FER, minimum FER, may all be or comprise power control parameter that cause wireless devices 121-124 to be more likely to request increases in power from base station 110. For example, raising and lowering the target FER used by a wireless device 121-124 will raise and lower, respectively, the likelihood that a wireless device 121-124 will request an increase in transmit power. Similarly, raising and lowering the $E_b/N_o$ setpoint used by a wireless device 121-124 will raise and lower, respectively, the likelihood that a wireless device 121-124 will request an increase in transmit power. Adjusting power control parameters may also adjust the ultimate transmit power level that the closed-loop power control algorithm converges around. In addition, the sizes of the incremental changes made by base station 110 when increasing or decreasing transmit power may be, or comprise, a power control parameter.

Figure 2:
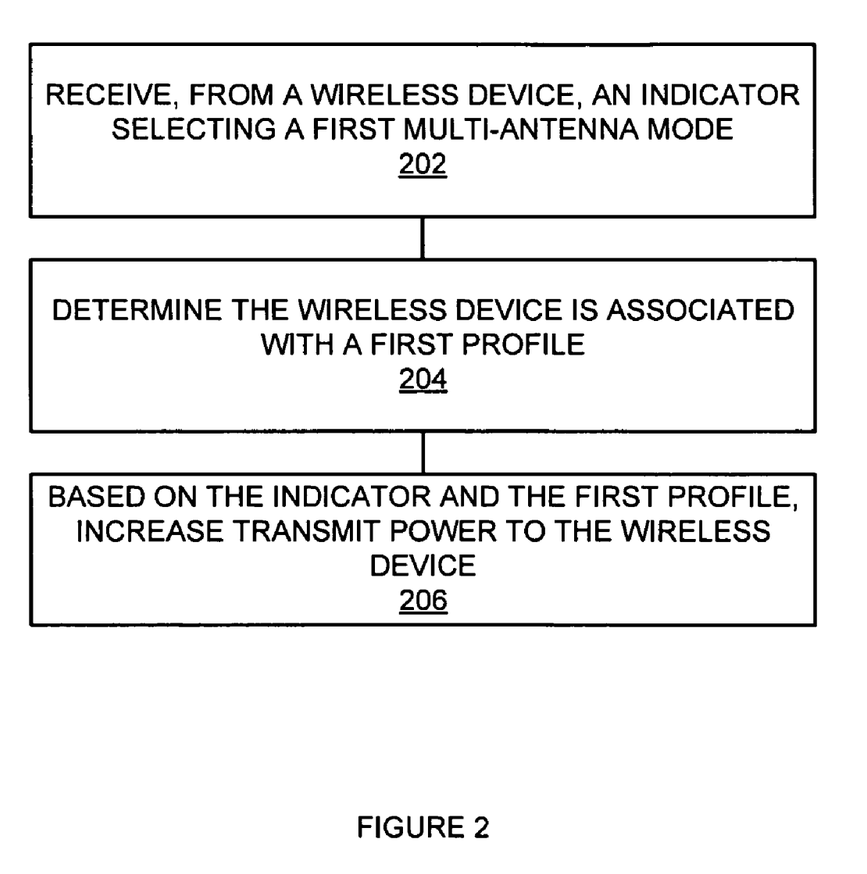
FIG. 2 is a flowchart illustrating a method of operating a communication system.

FIG. 2 is a flowchart illustrating a method of operating a communication system. The steps illustrated in FIG. 2 may be performed by one or more elements of communication system 100.

An indicator is received, from a wireless device, selecting a first multi-antenna mode (202). For example, base station 110 may receive an indicator from wireless device 121 selecting MIMO-A. In another example, base station 110 may receive an indicator from wireless device 123 selecting MIMO-B.

The wireless device is determined to be associated with a first profile (204). For example, communication system 100 may determine that wireless device 121 is associated with a high quality of service profile. In another example, communication system 100 may determine that wireless device 123 is associated with a low quality of service profile.

Based on the indicator, and the first profile, transmit power is increased to the wireless device (206). For example, based on wireless device 121's selection of MIMO-A, and wireless device 121's association with a high quality of service profile, base station 110 may increase transmit power to wireless device 121. Increasing the transmit power to wireless device 121 may result in an increased probability that wireless device 121 will select MIMO-B. Thus, wireless device 121 may receive a higher quality of service than wireless device 123. In another example, base station 110 may increase transmit power to wireless device 121 as the result of reconfiguring a power control parameter such that wireless device 121 is more likely to request increases in transmit power from base station 110.

Figure 3:
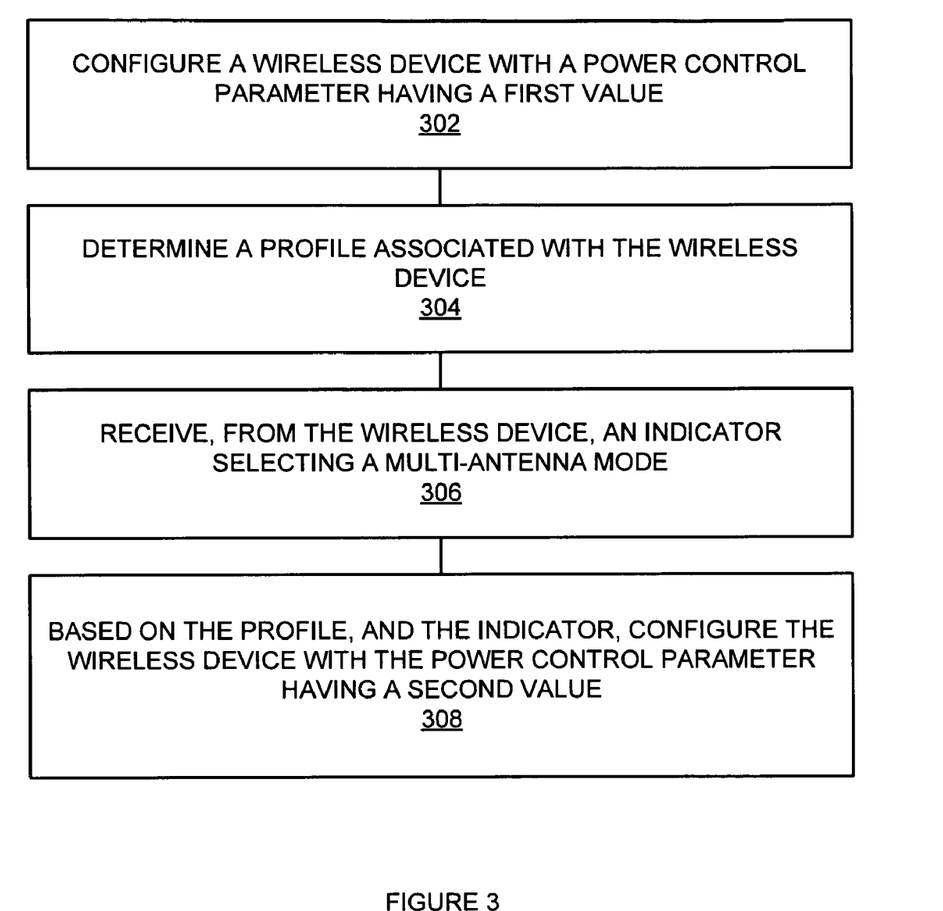
FIG. 3 is a flowchart illustrating a method of configuring a wireless device.

FIG. 3 is a flowchart illustrating a method of configuring a wireless device. The steps illustrated in FIG. 3 may be performed by one or more elements of communication system 100.

A wireless device is configured with a power control parameter having a first value (302). For example, wireless device 121 may be configured with a power control parameter having a first value. The value of the power control parameter may affect the likelihood that wireless device 121 will request increases in transmit power from base station 110. Examples of power control parameters that affect the likelihood that wireless device 121 will request increases in transmit power from base station 110 include parameters that affect the inner and outer loops of a closed-loop power control scheme. For example, in CDMA2000 a desired (or target) FER, $E_b/N_o$ setpoint, maximum $E_b/N_o$ setpoint, minimum $E_b/N_o$ setpoint, maximum FER, and/or minimum FER may contribute to the likelihood that wireless device 121 will request increases in transmit power from base station 110.

A profile associated with the wireless device is determined (304). For example, communication system 100 may determine that wireless device 121 is associated with a high quality of service profile. In another example, communication system 100 may determine that wireless device 123 is associated with a low quality of service profile.

An indicator selecting a multi-antenna mode is received from the wireless device (306). For example, base station 110 may receive, from wireless device 121, an indicator selecting MIMO-A. In another example, base station 110 may receive, from wireless device 123, an indicator selecting MIMO-B.

Based on the profile, and the indicator, the wireless device is configured with the power control parameter having a second value (308). For example, base station 110 may configure wireless device 121 with an inner loop or outer loop control parameter that increases the likelihood, and/or ultimate power level, that wireless device 121 requests base station 110 to use to transmit. In another example, base station 110 may configure wireless device 123 with an inner loop or outer loop control parameter that decreases the likelihood, and/or ultimate power level, that wireless device 123 requests base station 110 to use to transmit.

In an embodiment, base station 110 may configure wireless device 121 with an increased target FER, $E_b/N_o$ setpoint, maximum $E_b/N_o$ setpoint, minimum $E_b/N_o$ setpoint, maximum FER, and/or minimum FER. Increasing one or more of these power control parameters increases the likelihood wireless device 121 will request increases in transmit power from base station 110. Thus, the ultimate power level that base station 110 uses to transmit may be increased. Accordingly, wireless device 121 may be more likely to select MIMO-B thereby providing a higher quality of service to wireless device 121.

In an embodiment, base station 110 may configure wireless device 123 with a decreased target FER, $E_b/N_o$ setpoint, maximum $E_b/N_o$ setpoint, minimum $E_b/N_o$ setpoint, maximum FER, and/or minimum FER. Decreasing one or more of these power control parameters decreases the likelihood wireless device 121 will request increases in transmit power from base station 110. Thus, the ultimate power level that base station 110 uses to transmit may be decreased. Accordingly, wireless device 123 may be more likely to select MIMO-A thereby providing a lower quality of service to wireless device 123. In addition, when wireless device 123 selects MIMO-A, wireless device 121 may experience a higher quality of service.

Figure 4:
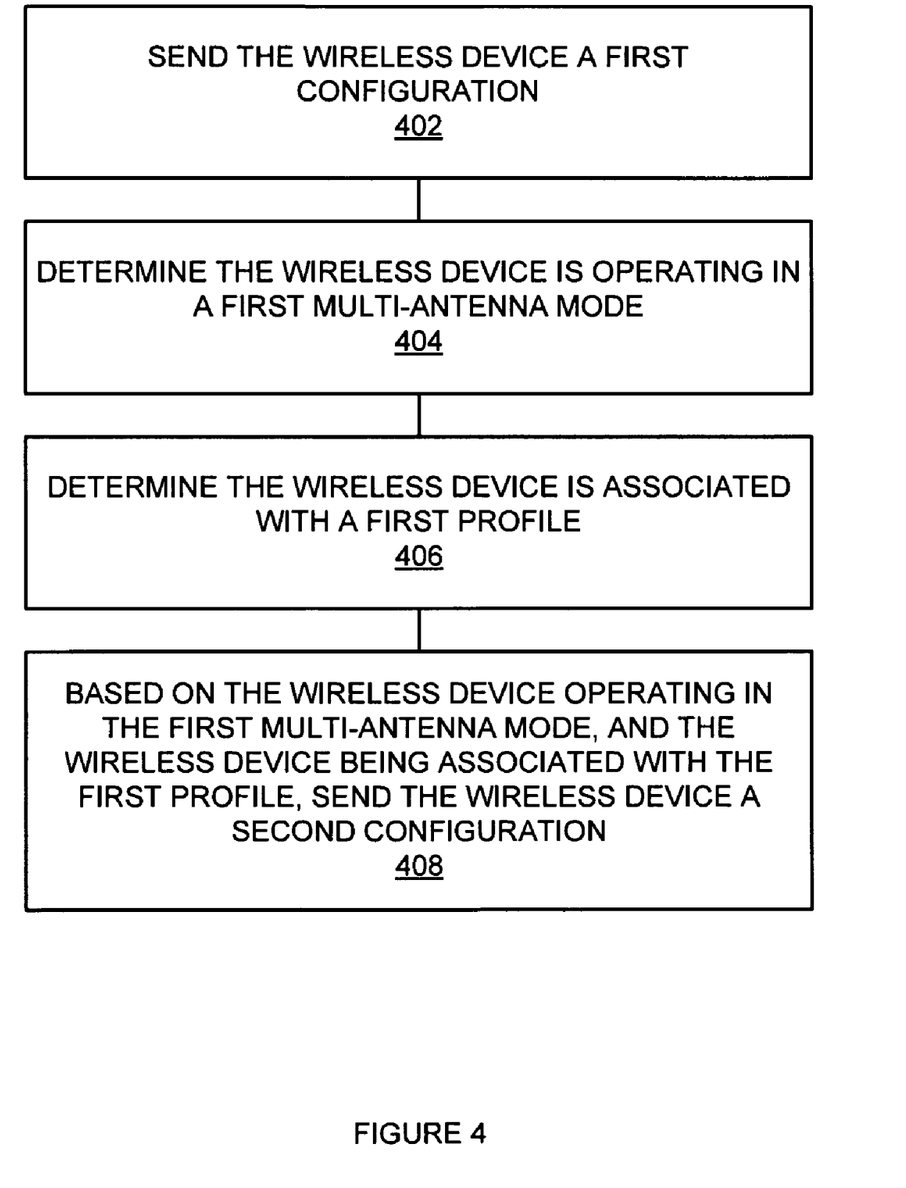
FIG. 4 is a flowchart illustrating a method of operating a wireless device.

FIG. 4 is a flowchart illustrating a method of operating a wireless device. The steps illustrated in FIG. 4 may be performed by one or more elements of communication system 100.

A wireless device is sent a first configuration (402). For example, base station 110 may send wireless device 121 a first configuration. This first configuration may include one or more power control parameters. These power control parameters may affect the likelihood that wireless device 121 will request increases in transmit power from base station 110. These power control parameters may also affect the transmit power base station 110 will use for a given set of channel conditions. Examples of power control parameters include target FER, $E_b/N_o$ setpoint, maximum $E_b/N_o$ setpoint, minimum $E_b/N_o$ setpoint, maximum FER, and/or minimum FER.

The wireless device is determined to be operating in a first multi-antenna mode (404). For example, base station 110 may determine that wireless device 121 has selected MIMO-A. In another example, base station 110 may determine that wireless device 123 has selected MIMO-B.

The wireless device is determined to be associated with a first profile (406). For example, communication system 100 may determine that wireless device 121 is associated with a high quality of service profile. In another example, communication system 100 may determine that wireless device 123 is associated with a low quality of service profile.

Based on the wireless device operating in the first multi-antenna mode, and the wireless device being associated with a first profile, the wireless device is sent a second configuration (408). For example, based on wireless device 121 operating using MIMO-A, and wireless device 121 being associated with a high quality of service profile, base station 110 may send wireless device 121 an increased target FER, $E_b/N_o$ setpoint, maximum $E_b/N_o$ setpoint, minimum $E_b/N_o$ setpoint, maximum FER, and/or minimum FER. Increasing one or more of these power control parameters may increase the likelihood wireless device 121 will request increases in transmit power from base station 110. It may also increase the power level that base station 110 uses to transmit under a given set of channel conditions. Thus, wireless device 121 may be more likely to select MIMO-B. This may provide a higher quality of service to wireless device 121.

In another example, based on wireless device 123 operating using MIMO-B, and wireless device 123 being associated with a low quality of service profile, base station 110 may send wireless device 123 a decreased target FER, $E_b/N_o$ setpoint, maximum $E_b/N_o$ setpoint, minimum $E_b/N_o$ setpoint, maximum FER, and/or minimum FER. Decreasing one or more of these power control parameters may decrease the likelihood wireless device 123 will request increases in transmit power from base station 110. It may also decrease the power level that base station 110 uses to transmit under a given set of channel conditions. Thus, wireless device 123 may be more likely to select MIMO-A. This may provide a lower quality of service to wireless device 123.

Figure 5:
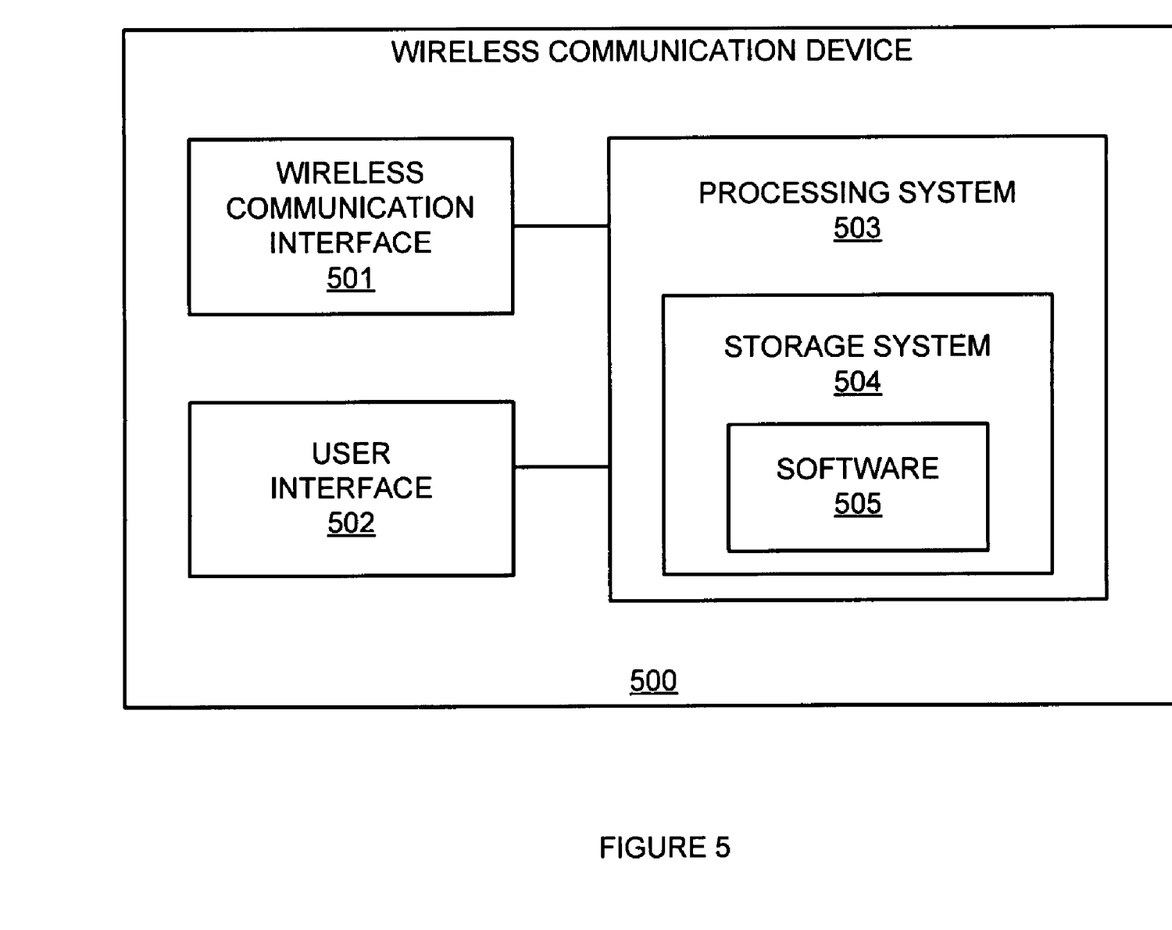
FIG. 5 is a block diagram of a wireless communication device.

FIG. 5 illustrates wireless communication device 500. Wireless communication device 500 is an example of wireless devices 121-124, although wireless devices 121-124 could use alternative configurations. Wireless communication device 500 comprises wireless communication interface 501, user interface 502, and processing system 503. Processing system 503 is linked to wireless communication interface 501 and user interface 502. Processing system 503 includes processing circuitry and storage system 504 that stores software 504. Wireless communication device 501 may include other well-known components such as a battery and enclosure that are not shown for clarity. Wireless communication device 501 may be a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, EVDO, WIMAX, GSM, LTE, WIFI, HSPA, or some other wireless communication format.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing system 503 may comprise a microprocessor and other circuitry that retrieves and executes software 505 from storage system 504. Storage system 504 may comprise a disk drive, flash drive, data storage circuitry, or some other memory apparatus. Processing system 503 is typically mounted on a circuit board that may also hold storage system 504 and portions of wireless communication interface 501 and user interface 502. Software 505 comprises computer programs, firmware, or some other form of machine-readable processing instructions. Software 505 may include an operating system, utilities, drivers, network interfaces, applications, or some other type of software. When executed by processing system 503, software 505 directs processing system 503 to operate wireless communication device 500 as described herein.

Figure 6:
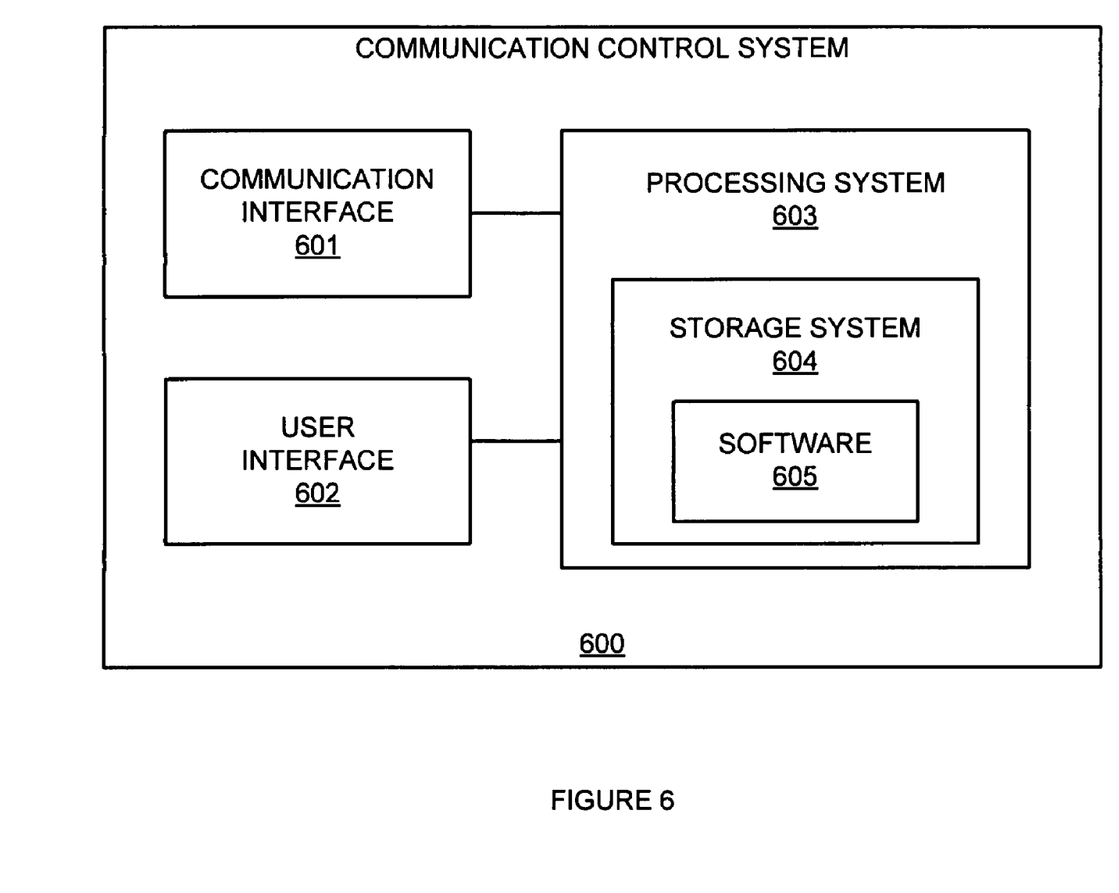
FIG. 6 is a block diagram of a communication control system.

FIG. 6 illustrates communication control system 600. Communication control system 600 may be an example of one or more components of base station 110, although base station 110 may use alternative configurations. Communication control system 600 comprises communication interface 601, user interface 602, and processing system 603. Processing system 603 is linked to communication interface 601 and user interface 602. Processing system 603 includes storage system 604 that stores software 605.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing system 603 may comprise a microprocessor and other circuitry that retrieves and executes software 605 from storage system 604. Storage system 604 may comprise a disk drive, flash drive, data storage circuitry, or some other memory apparatus. Software 605 comprises computer programs, firmware, or some other form of machine-readable processing instructions. Software 605 may include an operating system, utilities, drivers, network interfaces, applications, or some other type of software. When executed by processing system 603, software 605 directs processing system 603 to operate communication control system 600 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   receiving, from a wireless device associated with a first quality of service profile, an indicator selecting a first multi-antenna mode;
   determining the wireless device is associated with the first quality of service profile; and,
   based on the indicator and the first quality of service profile, transferring from a base station a power control parameter to the wireless device, wherein the power control parameter is associated with a closed-loop power control process of the wireless device;
   responsive to a request for increased transmit power received from the wireless device, increasing transmit power from the base station to the wireless device, wherein the wireless device selects a second multi-antenna mode responsive to increasing the transmit power from the base station.

2. The method of claim 1, wherein the request for increased transmit power is based on an indicator of an energy per bit to noise ratio (Eb/No) satisfying a criteria.

3. The method of claim 2, wherein the criteria is based on an Eb/No setpoint and the Eb/No setpoint is increased based on the indicator and the first quality of service profile.

4. The method of claim 1, wherein the request for increased transmit power is based on an indicator of a frame error rate (FER) satisfying a criteria.

5. The method of claim 4, wherein the criteria is based on a FER setpoint and the FER setpoint is decreased based on the indicator and the first quality of service profile.

6. The method of claim 1, wherein the first multi-antenna mode comprises operating the wireless device in a space-time coding MIMO mode.

7. A method of operating a communication system, comprising:
   configuring a wireless device with a power control parameter having a first value, wherein the first power control parameter is associated with a closed-loop power control process of the wireless device that determines whether the wireless device requests an increase in transmit power from a base station;
   determining a quality of service profile associated with the wireless device;
   receiving an indicator selecting a first multi-antenna mode from the wireless device; and,
   based on the quality of service profile and the indicator, configuring the wireless device with the power control parameter having a second value, wherein the wireless device selects a second multi-antenna mode responsive to the second value.

8. The method of claim 7, wherein the power control parameter determines a maximum Eb/No setpoint.

9. The method of claim 7, wherein the power control parameter determines a minimum Eb/No setpoint.

10. The method of claim 7, wherein the power control parameter determines a target frame error rate (FER).

11. The method of claim 7, wherein the second value causes the wireless device to increase an Eb/No setpoint used by the wireless device to determine whether to send a request of increased transmit power.

12. The method of claim 7, wherein the second value causes the wireless device to decrease an Eb/No setpoint used by the wireless device to determine whether to send a request of increased transmit power.

13. The method of claim 7, further comprising:
based on the profile and the indicator, configuring the base station to respond with larger incremental changes in transmit power in response to requests for an increase in transmit power and requests for a decrease in transmit power from the wireless device.

14. The method of claim 7, wherein the first multi-antenna mode comprises operating the wireless device in a space-time coding MIMO mode.

15. The method of claim 7, wherein the first multi-antenna mode comprises operating the wireless device in a MIMO mode wherein a data stream is split into multiple lower rate data streams and each data stream is transmitted from a different transmit antenna in the same frequency channel.

16. A method of operating a wireless device, comprising:
sending the wireless device a first configuration associated with a closed-loop power control process of the wireless device;
determining the wireless device is operating in a first multi-antenna mode;
determining the wireless device is associated with a first quality of service profile; and,
based on the wireless device operating in the first multi-antenna mode, and the wireless device being associated with the first quality of service profile, sending the wireless device a second configuration, wherein the wireless device selects a second multi-antenna mode responsive to the second configuration.

17. The method of claim 16, wherein an Eb/No setpoint is changed between the first configuration and the second configuration.

18. The method of claim 16, wherein the first multi-antenna mode comprises operating the wireless device in a space-time coding MIMO mode.

19. The method of claim 16, wherein the first multi-antenna mode comprises operating the wireless device in a MIMO mode wherein a data stream is split into multiple lower rate data streams and each data stream is transmitted from a different transmit antenna in the same frequency channel.

* * * * *